US008267242B2

(12) United States Patent
Kim et al.

(10) Patent No.: US 8,267,242 B2
(45) Date of Patent: Sep. 18, 2012

(54) SEAMLESS BELT

(75) Inventors: Ji Sung Kim, Seoul (KR); Ki Nam Kwak, Yongin-si (KR); Deug Soo Ryu, Yongin-si (KR); Jeong Han Kim, Gyeonggi-do (KR)

(73) Assignee: Kolon Industries, Inc., Gwacheon-si, Gyeonggi-do (KR)

( * ) Notice: Subject to any disclaimer, the term of this patent is extended or adjusted under 35 U.S.C. 154(b) by 293 days.

(21) Appl. No.: 12/551,943

(22) Filed: Sep. 1, 2009

(65) Prior Publication Data

US 2010/0051423 A1 Mar. 4, 2010

(30) Foreign Application Priority Data

Sep. 3, 2008 (KR) ........................ 10-2008-0086593

(51) Int. Cl.
*B65G 15/30* (2006.01)
*B65G 17/00* (2006.01)

(52) U.S. Cl. ..................... 198/844.2; 198/846; 252/511; 264/105; 264/512; 428/192

(58) Field of Classification Search .................. 198/617, 198/844.1, 846, 847, 844.2; 399/361; 252/511; 428/57, 192; 264/105, 512
See application file for complete search history.

(56) References Cited

U.S. PATENT DOCUMENTS

| | | | | |
|---|---|---|---|---|
| 4,711,833 | A * | 12/1987 | McAneney et al. | 430/131 |
| 4,747,992 | A * | 5/1988 | Sypula et al. | 264/130 |
| 5,143,573 | A * | 9/1992 | Ammon et al. | 156/294 |
| 5,273,799 | A * | 12/1993 | Yu et al. | 428/57 |
| 5,286,586 | A * | 2/1994 | Foley et al. | 430/56 |
| 5,518,854 | A * | 5/1996 | Yu et al. | 430/133 |
| 5,552,005 | A * | 9/1996 | Mammino et al. | 156/157 |
| 5,698,358 | A * | 12/1997 | Yu | 430/127 |
| 5,709,765 | A * | 1/1998 | Herbert et al. | 156/293 |
| 5,885,512 | A * | 3/1999 | Yu et al. | 264/512 |
| 6,456,816 | B1 * | 9/2002 | Chowdry et al. | 399/302 |
| 6,500,367 | B2 * | 12/2002 | Naus et al. | 264/39 |
| 7,734,244 | B2 * | 6/2010 | Yu et al. | 399/390 |
| 2009/0281227 | A1 * | 11/2009 | Stern et al. | |
| 2010/0301282 | A1 * | 12/2010 | Ninagoshi | |

* cited by examiner

*Primary Examiner* — Douglas Hess
(74) *Attorney, Agent, or Firm* — Sughrue Mion, PLLC

(57) ABSTRACT

Disclosed is a large seamless belt which is prevented from being curled in a width direction of the belt.

10 Claims, 4 Drawing Sheets

(a) (b)

(a) (b)

(a) (b)

(a)

(b)

SEAMLESS BELT

BACKGROUND OF THE INVENTION

1. Field of the Invention

The present invention relates to a seamless belt, and particularly to a seamless belt which is useful as a fixing belt or an intermediate transfer belt of a high-speed electrophotographic copier and so on, or a conveyor belt.

2. Description of the Related Art

In a copier or printer including an electrophotographic copier, a fax machine, a laser beam printer and so on, a heat fixing method has been typically employed, which includes forming an image of a toner made of a thermal fusible resin on recording paper through a process of imaging electrophotographs, electrostatic records or magnetic records, and then fixing the image using heat.

A fixing device used for the heat fixing method is generally exemplified by a heat roller type fixing device for feeding recording paper on which a toner image is formed between two rollers including a heat fixing roller containing a heater and a press roller to fix the toner image. Recently, a film fixing method using a seamless belt in film form made of polyimide or polyamide imide, in lieu of the heat fixing roller, is developed and widely utilized.

In an electrostatic copying process of a color copier or color printer, in order to obtain a full color image, toner images of respective colors are formed on a photoreceptor, and sequentially transferred onto an intermediate transfer belt, thus forming a multi-color toner image on the intermediate transfer belt, which is then electrostatically transferred again onto a transfer sheet, thereby forming a color image which is not out of focus.

The polymer for the intermediate transfer belt of a color copier or the like requires flame retardancy, strength and electrical stability, and a fluorine resin or a polyimide resin is thus used. There are many cases in which such a material may be mixed with a conductive additive such as carbon black to obtain desired electrical resistance. In particular, polyimide is a material useful in terms of strength and electrostatic properties.

An example of a method of manufacturing a seamless belt such as a fixing belt or an intermediate transfer belt includes applying a polyimide precursor solution such as a polyamic acid solution on the inner surface of a tubular metal base, maintaining its thickness uniform using centrifugal force, and performing drying and imidization by heat, thus obtaining a polyimide tubular product, which is then released from the base. This method may be utilized in the production of a tubular belt having a diameter of 70~500 mm.

Also known is a method including uniformly applying the polyimide precursor solution such as a polyamic acid solution on the outer surface of the metal base, and performing drying and imidization by heat, thus obtaining a polyimide tubular product, which is then released from the base. This method is employed only when manufacturing a tubular belt having a diameter of 70 mm or less.

If the polyimide precursor solution is applied and dried on the outer surface of the metal base to produce a tubular belt having a diameter of 70 mm or more, the adhesion area between the polyimide precursor and the metal base is large and adhesivity therebetween is strong. Upon release of the tubular belt, the tubular belt may be easily damaged. Also, after imidization of the polyimide precursor by heat, the tubular product may be contracted and is thus strongly adhered to the metal base, undesirably requiring a stronger release force. It is therefore difficult to easily release the belt product from the base.

In order to solve these problems, there have been proposed alternative methods including applying a polyimide precursor solution on a base coated with a release agent, performing heating until obtaining a strength strong enough to support at least the shape of a tubular product, releasing the product from the base, fitting the product into the base again and then burning it; and including forming small holes in a base, applying a polyimide precursor solution on the base, burning it, forcibly feeding air through such small holes from inside the base and releasing a tubular product from the base.

However, these methods cannot be utilized when manufacturing a tubular belt having a diameter of 500 mm or more, and thus there are no mass produced products. If a tubular metal base having a diameter of 500 mm or more is manufactured and subjected to the above method for coating the inner or outer surface of the base, the weight and volume of the metal base which should be rotated at high velocity while maintaining a tubular shape are increased, and thus working becomes very dangerous, mechanical energy cost is increased, and parts of a mechanical device are easily worn, resulting in increased maintenance cost.

Furthermore, an extrusion process or an injection process requires an increase in the size of a mechanical device, undesirably increasing the manufacturing cost. As well, methods of controlling uniform heating and polymer behavior have not yet been developed.

Currently useful is a method of bonding both ends of a polyimide film to each other thus producing a tubular belt having a large diameter.

However, the tubular belt resulting from bonding of the film suffers because mechanical and electrical properties of the bonded portion may vary depending on the type of adhesive used for the bonded portion and the degree of overlap of both ends of the film. In a laser printer, it is thus difficult to uniformly transfer a toner and defective rates may be increased. Also, because a seam exists on the bonded portion, it may come into contact with an electronic device such as a photoreceptor drum of a laser printer and thus damage may occur during operation of the device. Hence, the development of a novel large seamless tubular belt is urgently required.

As well, in the case where the belt obtained by applying the polymer resin on a base and performing drying and heat treatment has a large diameter, it may be curled in its width direction, undesirably bending predetermined portions thereof. Furthermore, such curling may incur the meandering motion on a rotator, and ultimately, a case in which the belt breaks may occur. Therefore, there is a need to prevent the curling of the belt.

SUMMARY OF THE INVENTION

Accordingly, the present invention intends to provide a large seamless belt.

The present invention also intends to provide a large seamless belt which is controlled in terms of curling.

An aspect of the present invention provides a seamless belt, which is in a tubular form having an inner diameter of 500 mm or more and has a curl of 3 cm or less as measured using a curl measurement method including cutting a seamless belt to a size of 10 cm×10 cm, placing the cut seamless belt on a glass plate and then measuring the height of the corner thereof maximally curled upward from the surface of the glass plate.

In this aspect, the seamless belt may include any one or a copolymer or mixture of two or more selected from the group consisting of a polyamide resin, a polyimide resin, a polystyrene resin, a polysiloxane resin and a silicone resin.

In this aspect, the seamless belt may further include one or more selected from the group consisting of polyaniline, polythiophene, polypyrrole, polyacetylene, polyphenylene vinylene, polyphenylene sulfide, phthalocyanine, and polyfluorene.

In this aspect, the seamless belt may include 3~30 wt % of one or more electrical conductive materials selected from the group consisting of at least one conductive inorganic material selected from among indium tin oxide (ITO), $In_2O_3(ZnO)_k$ (IZO) in which the amount of ITO is small, ternary indium-tin-zinc oxide ($In_2O_3$—$SnO_2$—ZnO), antimony tin oxide (ATO) and aluminum-doped zinc oxide (AZO), carbon black, and graphite, or may include 0.01~3 wt % of a highly conductive material.

In this aspect, the seamless belt may include 0.3~30 wt % of one or more thermal conductive fillers selected from the group consisting of boron nitride (BN), magnesium oxide (MgO), manganese oxide (MnO) and germanium (Ge).

In this aspect, the seamless belt may have a surface resistivity ranging from $1.0\times10^7$ to $1.0\times10^{15}\Omega/\square$.

In this aspect, the seamless belt may have a surface roughness Rz of 3 μm or less.

In this aspect, the seamless belt may have a thermal dimensional change rate of 1% or less.

In this aspect, the seamless belt may have a modulus of 2.0 GPa or more.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1:
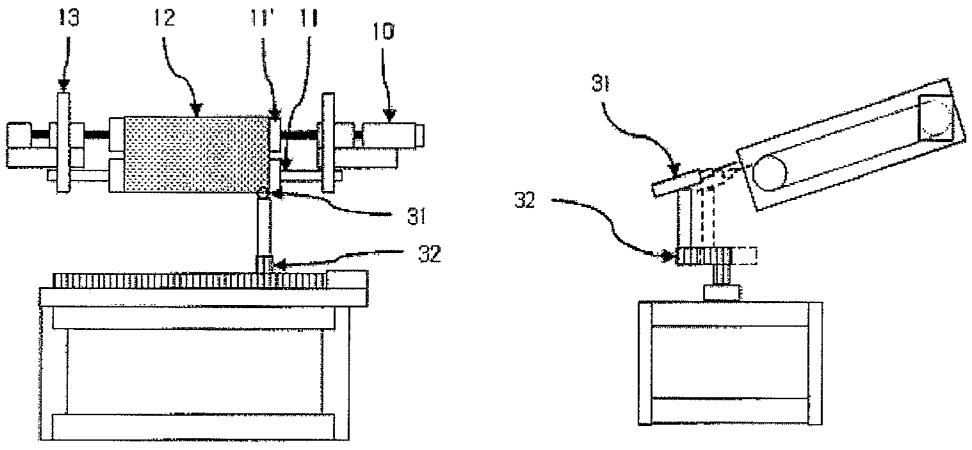
FIGS. 1A and 1B are respectively a front view and a side view showing an apparatus for manufacturing a seamless belt according to a first embodiment of the present invention.

Hereinafter, a detailed description will be given of the present invention.

The present invention pertains to a seamless belt which is in a tubular form having an inner diameter of 500 mm or more and is made of one piece without seams. Further, the seamless belt may have a curl of 3 cm or less as measured using a curl measurement method including cutting a seamless belt to a size of 10 cm×10 cm, placing the cut seamless belt on a glass plate and then measuring the height of the corner thereof maximally curled upward from the surface of the glass plate.

The seamless belt according to the present invention may be manufactured using a thermoplastic or thermosetting resin, in particular a highly heat-resistant resin. For example, the seamless belt may include any one or a copolymer or mixture of two or more selected from the group consisting of a polyamide resin, a polyimide resin, a polystyrene resin, a polysiloxane resin and a silicone resin.

The polyimide resin is obtained by copolymerizing a diamine and a dianhydride thus preparing a polyamic acid solution which is a polyimide precursor and then imidizing the polyamic acid solution, and has a glass transition temperature of 200° C. or higher to thus exhibit high heat resistance, so that it is not easily deformed.

The dianhydride may be one or more selected from the group consisting of 2,2-bis(3,4-dicarboxyphenyl)hexafluoropropane dianhydride (FDA), 4-(2,5-dioxotetrahydrofuran-3-yl)-1,2,3,4-tetrahydronaphthalene-1,2-dicarboxylic anhydride (TDA), 4,4'-(4,4'-isopropylidenediphenoxy)bis (phthalic anhydride) (HBDA), 3,3'-(4,4'-oxydiphthalic dianhydride) (ODPA), 3,4,3,4'-biphenyltetracarboxylic dianhydride (BPDA), 2,2-bis[4-(dicarboxyphenoxy)phenyl]propane dianhydride (BSAA), pyromellitic dianhydride (PMDA), and benzophenone tetracarboxylic dianhydride (BTDA).

The diamine may be one or more selected from the group consisting of para-phenylenediamine (p-PDA), 4,4-methylenedianiline (MDA), 4,4-oxydianiline (ODA), meta-bisaminophenoxydiphenylsulfone (m-BAPS), para-bisaminophenoxydiphenylsulfone (p-BAPS), 2,2-bisaminophenoxyphenylpropane (BAPP), 2,2-bisaminophenoxy phenylhexafluoropropane (HF-BAPP), 2,2-bis[4-(4-aminophenoxy)-phenyl]propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), and 2,2'-bis[4(4-aminophenoxy)phenyl]hexafluoropropane (4-BDAF).

The dianhydride and the diamine are dissolved in equimolar proportions in an organic solvent and are then allowed to react, thus preparing the polyamic acid solution.

The solvent used in the solution polymerization of the above monomers is not particularly limited, as long as polyamic acid can be dissolved therein. The known reaction solvent may include one or more polar solvents selected from the group consisting of m-cresol, N-methyl-2-pyrrolidone (NMP), dimethylformamide (DMF), dimethylacetamide (DMAc), dimethylsulfoxide (DMSO), acetone, and diethylacetate. In addition, a low-boiling-point solvent, such as tetrahydrofuran (THF) or chloroform, or a low-absorbing-solvent, such as γ-butyrolactone, may be used.

The seamless belt such as an antistatic or intermediate transfer belt requiring electrical conductivity may further include, in addition to the polymer resin for the seamless belt, one or more electrical conductive polymer resins selected from the group consisting of polyaniline, polythiophene, polypyrrole, polyacetylene, polyphenylene vinylene, polyphenylene sulfide, phthalocyanine, and polyfluorene.

Moreover, in order to increase electrical conductivity, the seamless belt according to the present invention may contain 3~30 wt % of one or more electrical conductive materials selected from the group consisting of at least one conductive inorganic material selected from among indium tin oxide (ITO), indium zinc oxide (IZO, $In_2O_3(ZnO)_k$), ternary indium-tin-zinc oxide ($In_2O_3$—$SnO_2$—ZnO), antimony tin oxide (ATO) and aluminum-doped zinc oxide (AZO), carbon black, and graphite, or may contain 0.01~3 wt % of a highly conductive material such as carbon nanotubes.

If the amount of the conductive material is less than the lower limit, the degree of improvement in electrical conductivity is low, and also, the number of manufacturing process steps is increased, undesirably increasing the manufacturing cost, resulting in process inefficiency. In contrast, if the amount thereof is greater than the upper limit, surface resistivity is remarkably reduced and thus electrical conductivity may be additionally improved but mechanical properties required for the seamless belt according to the present invention applied on a rotator may be deteriorated.

Also, the seamless belt according to the present invention may further include one or more thermal conductive fillers selected from the group consisting of boron nitride (BN), magnesium oxide (MgO), manganese oxide (MnO) and germanium (Ge). The thermal conductive filler may be used in an amount of 0.3~30 wt % in terms of increasing thermal conductivity to a desired level and of improving process efficiency regarding the manufacturing cost attributable to an increase in the number of manufacturing process steps while taking into consideration mechanical properties. Hence, the seamless belt containing the thermal conductive filler may be adapted for use in a fixing belt.

The seamless belt according to the present invention may have a surface resistivity ranging from $1.0\times10^{7}$ to $1.0\times10^{15}\Omega/\square$ in consideration of electrical conductivity, and a modulus of 2.0 GPa or more in consideration of mechanical properties. The seamless belt may have a thickness of 30~500 μm. Also, the seamless belt may have a thermal dimensional change rate of 1% or less in consideration of heat resistance. Furthermore, the seamless belt may have a surface roughness Rz of 3 μm or less so as to efficiently perform a function as an intermediate transfer belt or a fixing belt, and specifically, may have an inner surface roughness of 3 μm or less and an outer surface roughness of 1 μm or less.

The seamless belt according to the present invention may be manufactured by, while rotating an endless belt made of a metal or composite polymer in a state of being wound around two or more rotating rollers, applying a polymer resin or a polymer resin precursor on the endless belt and then drying it.

Below, the present invention is specified with reference to the accompanying drawings. However, the present invention is not restricted to the accompanying drawings.

Figure 2:
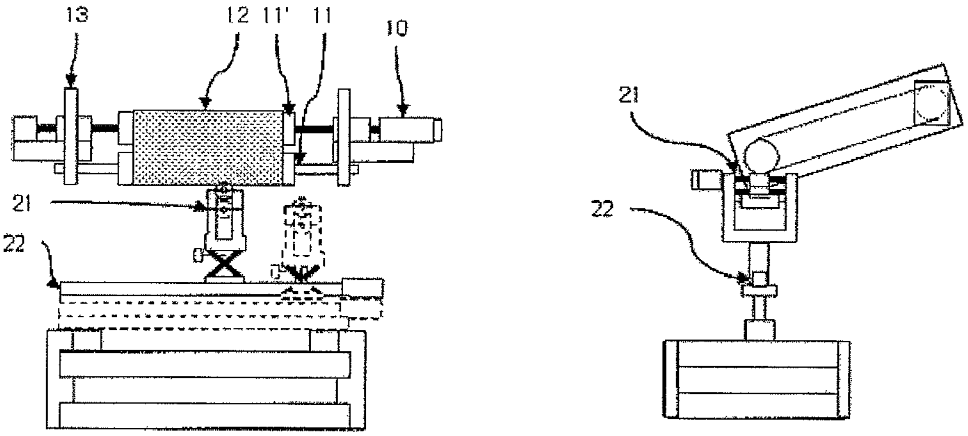
FIGS. 2A and 2B are respectively a front view and a side view showing an apparatus for manufacturing a seamless belt according to a second embodiment of the present invention.
Figure 3:
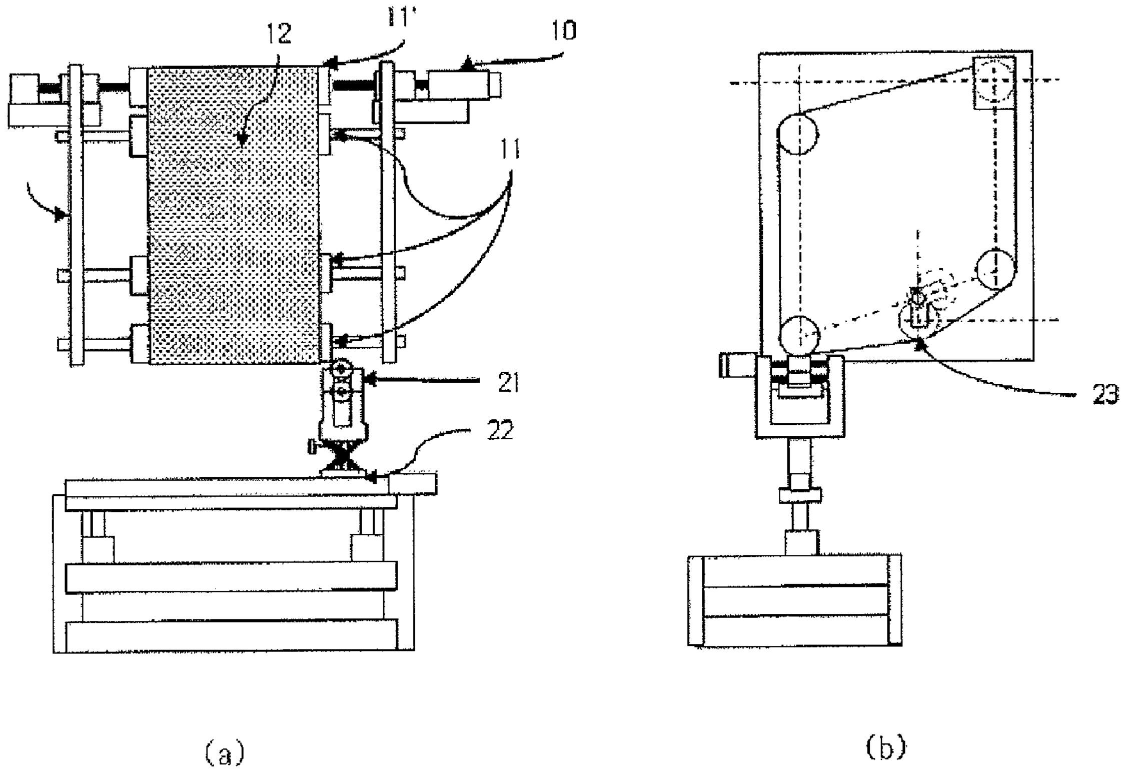
FIGS. 3A and 3B are respectively a front view and a side view showing an apparatus for manufacturing a seamless belt according to a third embodiment of the present invention.

FIGS. 1A and 1B are respectively a front view and a side view showing an apparatus for manufacturing the seamless belt according to a first embodiment of the present invention, FIGS. 2A and 2B are respectively a front view and a side view showing an apparatus for manufacturing the seamless belt according to a second embodiment of the present invention, and FIGS. 3A and 3B are respectively a front view and a side view showing an apparatus for manufacturing the seamless belt according to a third embodiment of the present invention. FIGS. 4A and 4B are respectively a side view and a top plan view showing an apparatus for manufacturing the seamless belt according to a fourth embodiment of the present invention, and FIG. 5 is a side view showing an apparatus for manufacturing the seamless belt according to a fifth embodiment of the present invention.

The seamless belt according to the present invention is manufactured in a manner such that the endless belt 12 made of metal or composite polymer is wound around two or more idler rollers 11 to thus rotate it, and the polymer resin or polymer resin precursor is applied on the endless belt 12 which is rotating, and then dried.

Although the rotation velocity of the endless belt 12 is difficult to particularly limit because of being closely related to the viscosity of the applied polymer resin or polymer resin precursor, it may be set to a linear velocity of 3~30 m/min in consideration of a minimum velocity able to thoroughly apply the polymer resin or polymer resin precursor onto the endless belt without leaving any uncovered spots and a maximum velocity preventing the applied polymer resin or polymer resin precursor from being removed due to centrifugal force during passing through the cylindrical rollers.

The apparatus for manufacturing the seamless belt may include the endless belt 12 made of metal or composite polymer, one or more idler rollers 11, one or more driving rollers 11' which are driven by at least one driving motor 10, one or more tension control rollers 23, a removable roller support 13, a coating head 21, 31 for applying the polymer resin, and a drier 43.

Also, the apparatus for manufacturing the seamless belt may include a transporter 40, 50 and dry chambers 44 having an opening door 41.

The removable roller support 13 may be easily attached or detached or opened or closed so that the endless belt 12 and the seamless belt are wound around or separated from the driving rollers 11' and the idler rollers 11 or the tension control rollers 23, and functions to immovably hold the driving rollers 11' and the idler rollers 11 or the tension control rollers 23. The removable roller support 13 may be provided on at least one end of the rollers.

The apparatus for manufacturing the seamless belt preferably includes the transporter 40, 50 for transporting all of the endless belt 12, the polymer resin or polymer resin precursor applied on the endless belt 12, the driving rollers 11', the idler rollers 11, the tension control rollers 23 and the roller support 13 to a separation zone 46 through drying chambers 44 from a coating zone 45. As such, a transport method using the transporter may be selected from among a method of transporting all (in the example, an endless belt rotator) of the endless belt 12, the polymer resin or polymer resin precursor applied on the endless belt 12, the driving rollers 11', the idler rollers 11, the tension control rollers 23 and the roller support 13 in the state of being securely mounted on a mounting member 42 of a turntable 40 in planar rotation, a transport method using a conveyor 50 including a metal belt or a metal mesh belt and one or more driving rollers 52, and a Walking beam transport method, but is not limited thereto. The transport method may be a continuous type or a semi-continuous type.

Because the endless belt 12 on which the polymer resin or polymer resin precursor for the seamless belt is applied is exposed to a drying process, it is preferably made of metal or composite polymer which is very resistant to heat.

For example, the metal may be one or more selected from the group consisting of stainless steel (SUS), nickel, chromium, copper and aluminum, and the thickness of the endless belt made of metal may be set to 0.1~2 mm. If the thickness is less than 0.1 mm, the belt may be easily crumpled, undesirably deteriorating workability and increasing the material cost. In contrast, if the thickness is greater than 2 mm, flexibility of the belt is reduced and the size of the roller is increased, thereby increasing the weight of a mechanical device and shortening the replacement period of parts of the device, resulting in increased cost.

On the other hand, the endless belt 12 made of composite polymer may include one or more selected from the group consisting of silicone, polyimide, polyamide imide, a liquid crystal polymer and a fluorine resin, and preferably further includes a tension member made of glass fiber or aramid fiber. The polymer material as mentioned above, for example, silicone, polyimide, polyamide imide, a liquid crystal polymer or a fluorine resin, has high heat resistance and thus does not cause thermal deformation even by heat at about 250° C. or higher and is ultimately suitable for use in the present invention. However, in the case where strong tension is applied to the endless belt composed solely of the polymer resin, dimensional change may easily occur, and in particular, mechanical properties may be further deteriorated upon heating. Hence, in order to improve mechanical properties and heat resistance, the tension member may be disposed in the middle portion of the belt in a thickness direction. The tension member is preferably made of glass fiber or aramid fiber. The thickness of the endless belt made of composite polymer is not particularly limited but may be set to 0.03~5 mm. The endless belt 12 made of composite polymer may be manufactured by cutting a film made of the above polymer material, bonding both ends of the cut film using heat sealing or an adhesive thus forming a belt, optionally winding a tension member on the belt, additionally applying a polymer resin solution which is the same as or different from the above polymer film so that a seam does not protrude, and then performing drying and heat treatment.

Also, the endless belt 12 may further include a low surface tension resin layer having a surface tension of 30 dyne/cm or less. The resin layer may be made of one or more selected from the group consisting of a fluorine resin such as PTFE, PFA, FEP and ETFE, and a silicone resin or silicone oil such as polysiloxane and polydimethylsiloxane. Particularly useful is PTFE which is a superior material having a surface tension of 20~22 dyne/cm and a melting point of 320° C. or higher and being usable at 280° C. or higher without thermal deformation. The silicone resin may be used by mixing it with an additional curing agent, applying the mixture and curing the applied mixture, and has surface tension and heat resistance similar to those of the fluorine resin and is relatively economical. Such a low surface tension resin layer may have a thickness of 100 μm or less.

When the low surface tension resin layer is formed on the endless belt 12 in this way, the resultant seamless belt may be further prevented from curling. This is because curling is assumed to be caused by different coefficients of thermal expansion between the polymer resin for the endless belt and the polymer resin for the seamless belt, and such a low surface tension resin layer is responsible for preventing the resin layers having different coefficients of thermal expansion from coming into direct contact with each other.

If an endless belt 12 having no low surface tension resin layer is used, a force in which the polymer resin for the seamless belt is contracted through drying and heat treatment may remain as stress on the surface of the seamless belt in contact with the endless belt, and also, the degree of contraction of the outer surface of the seamless belt becomes different from that of the inner surface thereof, undesirably curling the seamless belt separated from the endless belt in an inward or outward direction.

The above endless belt 12 has much higher heat resistance than that of a typical conveyor belt. In particular, the endless belt has low dimensional change even after a heating process to thus increase product reliability. The endless belt 12 preferably has a dimensional change rate of 1% or less even after a heating process. If the dimensional change rate exceeds 1%, creases such as corrugations may be formed on the seamless belt.

Also, the endless belt 12 preferably has an outer surface roughness of 3 μm or less. If the surface roughness exceeds 3 μm, it is difficult to uniformly transfer fine particles such as the toner used in a laser printer, and resolution may be lowered.

The seamless belt according to the present invention results from applying the polymer resin or polymer resin precursor in a solution state. As such, the coating head is used, and is not particularly limited as long as the polymer resin or polymer resin precursor may be applied on the endless belt 12, which is rotating, by means thereof. In order to achieve uniform coating, a coating method may include for example dispenser coating, reverse coating, dipping, die coating, comma coating, gravure coating or lip coating. The coating head 21, 31 may not be moved, or may be moved to a direction and a velocity controlled by a robot 22, 32. For example, because the coating head such as a dispenser 31 or a reverse 21 has a small application area, it needs a robot upon movement in a width direction of the belt.

The polymer resin applied on the endless belt is heated using hot air or a heater so that the volatile additive and the solvent contained in the polymer resin are dried thus completing manufacture of the seamless belt. In the case where the polymer resin precursor such as polyamic acid is applied, it is imidized through drying and heat treatment, thereby manufacturing the seamless belt.

For example, in the case where the polyamic acid solution is applied or where a polyimide resin soluble in a solvent is applied, the polymer resin is dried so that a solvent residual rate is 5% or less at 80~200° C., and heat treated at 250~280° C. for thermal curing or imidization, thereby completing manufacture of the seamless belt.

Also, in order to further increase mechanical properties and heat resistance of the polyimide, additional heat treatment the final temperature of which is increased to 400° C. may be applied. After separation of the polyimide seamless belt in which the contraction of the polymer resin layer by imidization through heat treatment at 250~280° C. for 0.5~3 hours is considered to be terminated, additional heat treatment may be performed using a high temperature heat treatment apparatus including an endless belt 12 made of metal, driving rollers 11', idler rollers 11, tension control rollers 23 and a roller support 13. In this case, because there is no or very small contraction of the polymer resin, such additional heat treatment does not greatly affect the curling of a final product. Also, because the materials for the low surface tension resin, the endless belt and various kinds of rollers should have heat resistance to 400° C. or higher, such additional heat treatment is required.

A better understanding of the present invention may be obtained through the following examples, which are set forth to illustrate, but are not to be construed as limiting the present invention.

EXAMPLE 1

In a 2 l four-neck flask equipped with a mechanical stirrer, a reflux condenser and a nitrogen inlet, 922.20 g of DMF and 6.5 g (4.7 wt %) of Ketjen black (Ketjenblack EC 600 JD, available from KETJENBLACK, Japan) were mixed, nitrogen was fed thereto, and dispersion was performed using ultrasonic waves at 200 W and 40 kHz for 1 hour. Thereafter, 52.49 g of oxydianiline (available from WAKAYAMA, Japan) was added thereto and thus dissolved, and 85.31 g of benzophenone dianhydride was added three times in divisional proportions, thus preparing semi-conductive polyamic acid.

The semi-conductive polyamic acid thus prepared was a uniform black solution and had a viscosity of 400 poise.

Figure 4:
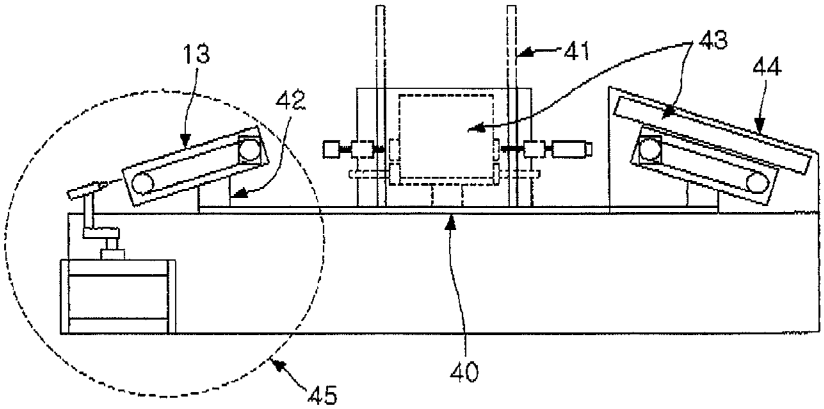
FIGS. 4A and 4B are respectively a side view and a top plan view showing an apparatus for manufacturing a seamless belt according to a fourth embodiment of the present invention.
Figure 4:
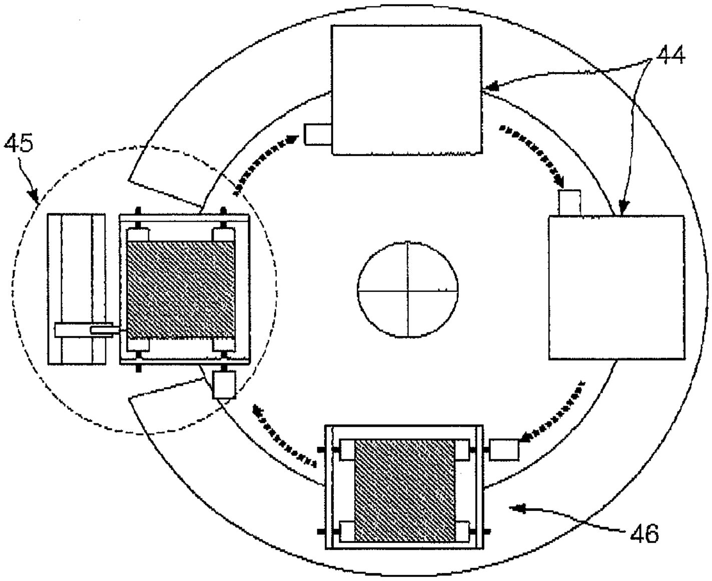
Figure 5:
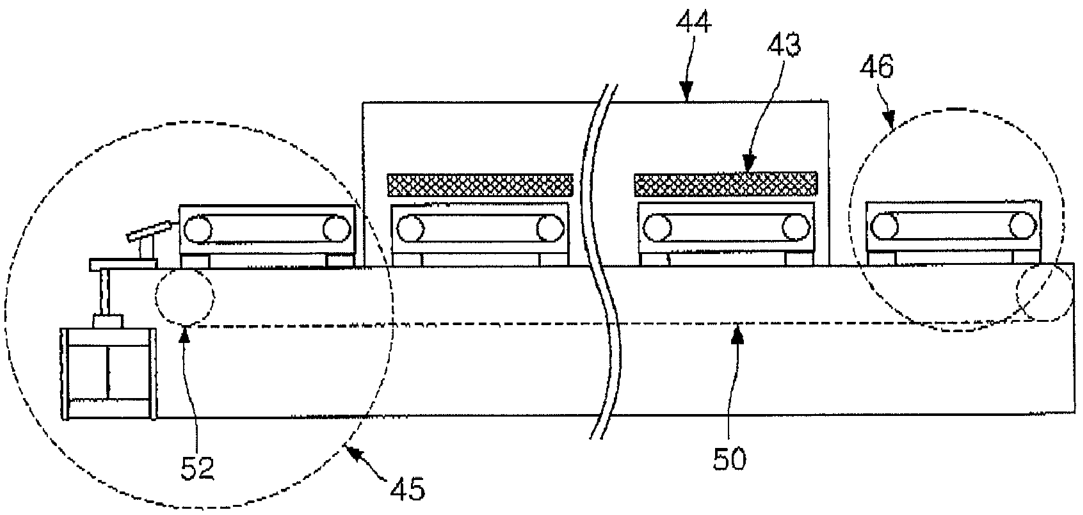
FIG. 5 is a side view showing an apparatus for manufacturing a seamless belt according to a fifth embodiment of the present invention.

An apparatus for manufacturing a seamless belt comprising a turntable 40 having a diameter of 5 m, a dispenser coating head 31, a drier 43 including a far-infrared heater and an opening door 41, drying chambers 44 and a separation zone 46 was constructed as shown in FIG. 4.

An endless belt (available from NAMIL, Korea) made of stainless steel (SUS) and in tubular form having a diameter of 950 mm, a width of 600 mm, a thickness of 0.2 mm and a surface roughness of 0.2 μm were wound around two rollers 11, 11' having a diameter of 120 mm, and shafts of the two rollers were securely attached to a support 13, after which the roller 11' was connected to a driving motor, thus manufacturing an endless belt rotator.

The endless belt rotator was securely mounted on a mounting member of the turntable in the separation zone, and transported to a coating zone 45 through rotation of the turntable by 90°, and the endless belt was rotated at a linear velocity of 15 m/min, coated with a fluorine coating agent (surface tension 13 dyne/cm, DURASURF DS-3200, available from SAMIL CHEMICALS, Korea) and dried, thus forming a low surface tension resin layer having a thickness of 5 μm.

Thereafter, while the endless belt was rotated at the same velocity, the polyamic acid solution was applied on the entire width of 500 mm of the endless belt using a dispenser.

After the completion of the application, the turntable was rotated by 90° so that the endless belt rotator was transported to a first dry chamber. The opening door of the first dry chamber was closed, after which the endless belt and the surface of the polyamic acid solution applied thereon were heated to 120° C. using the far-infrared heater and dried at the same temperature for 30 min, and then further heated to 180° C. and dried at the same temperature for 30 min. After termination of the drying process, almost all of DMF contained in the polyamic acid solution was dried, and thus the solvent residual rate was 1.5%.

Thereafter, the turntable was rotated by 90° so that the endless belt rotator was transported to a second dry chamber, and the endless belt and the surface of the polyamic acid solution applied thereon were heated to 280° C. using the far-infrared heater and heat treated at the same temperature for 1 hour.

Thereafter, the endless belt rotator was transported to the separation zone, so that the endless belt rotator was detached and the support was removed, thus separating the dried and imidized polyimide seamless belt from the endless belt. The polyimide seamless belt was provided in a tubular form having a good outer appearance with a diameter of 950 mm, a thickness of 65 μm, an inner surface roughness of 0.3 μm and an outer surface roughness of 0.7 μm. The curl of the belt was measured to be 1.1 cm.

The seamless belt had a surface resistivity of $4.2\times10^{10}\,\Omega/\square$ as measured using a surface resistivity meter, a modulus of 3.5 GPa, and a thermal dimensional change rate of 0.11% on average.

EXAMPLE 2

The material for the endless belt in Example 1 was replaced with the polyimide seamless belt obtained in Example 1, after which the outer surface of the polyimide belt was coated with a silicone resin (surface tension 22 dyne/cm, Rhodorsil Resin 6405, available from RHODIA, EU) and then cured, thus manufacturing a composite polymer endless belt. The endless belt had a thickness of 75 μm, an outer surface roughness of 0.4 μm, and a dimensional change rate of 0.1% in each of longitudinal/transverse directions after heat treatment.

Thereafter, a polyimide seamless belt was obtained in the same manner as in Example 1. The polyimide seamless belt was provided in a tubular form having a good outer appearance with a diameter of 951 mm, a thickness of 65 μm, an inner surface roughness of 0.5 μm and an outer surface roughness of 0.7 μm. The curl of the belt was measured to be 1.7 cm.

The seamless belt had a surface resistivity of $4.0\times10^{10}\,\Omega/\square$ as measured using a surface resistivity meter, a modulus of 2.7 GPa and a thermal dimensional change rate of 0.10% on average.

EXAMPLE 3

The present example was performed in the same manner as in Example 1, with the exception that the polyamic acid solution was prepared as below. Specifically, into a 1 l four-neck flask equipped with a mechanical stirrer, a reflux condenser and a nitrogen inlet, 435 g of DMF was added, and 10 g of boron nitride powder (SCP-1, available from ESK CERAMICS, Germany) for increasing thermal and mechanical strengths and surface lubricating properties and 1.3 g (2.0 wt %) of multi-walled carbon nanotubes (Stock # 1231YJ, available from NANOBEST, Korea) for imparting conductivity were then added. While dispersion was performed for 3 hours using a sonicator, nitrogen was fed thereto. Subsequently, 38.42 g of BPDA and 26.58 g of 4,4-oxydianiline were added into the flask and then allowed to react at room temperature for 3 hours. After completion of the reaction, a polyimide precursor having a viscosity of 180 poise at room temperature was obtained.

The resultant polyimide seamless belt was provided in a tubular form having a good outer appearance with a diameter of 950 mm, a thickness of 65 μm, an inner surface roughness of 0.6 μm and an outer surface roughness of 0.7 μm. The curl of the belt was measured to be 0.5 cm.

The seamless belt had a surface resistivity of $3.8\times10^{10}\,\Omega/\square$ as measured using a surface resistivity meter, a modulus of 3.6 GPa, and a thermal dimensional change rate of 0.08% on average.

COMPARATIVE EXAMPLE 1

A seamless belt was manufactured without the formation of a fluorine resin coating layer on the endless belt of Example 1. As such, in the course of separating the polyimide seamless belt from the endless belt, the strong adhesivity of the endless belt caused damaged thereto. The resultant polyimide seamless belt was provided in a tubular form having a diameter of 950 mm, a thickness of 65 μm, an inner surface roughness of 0.3 μm and an outer surface roughness of 0.7 μm. The belt was curled in an inward direction. The sample for measuring the curl of the belt was almost curled, and the curl of the belt was measured to be 4.3 cm.

The seamless belt had a surface resistivity of $2.5\times10^{10}\,\Omega/\square$ as measured using a surface resistivity meter, a modulus of 2.3 GPa, and a thermal dimensional change rate of 0.42% on average.

COMPARATIVE EXAMPLE 2

A polyimide seamless belt was manufactured in the same manner as in Comparative Example 1, with the exception that the polyamic acid solution was replaced with a solution obtained using an acrylic resin, specifically a solution prepared by adding 0.15 g (0.47 wt %) of carbon nanotubes (XM Grade, available from UNYDIM, USA) to 200 g of toluene, performing dispersion for 1 hour using a sonicator (200 W, 40 kHz, available from ULTEC, Korea), adding 30 g of an acrylic resin (available from AEKYOUNG CHEMICAL, Korea) and 1.5 g of isocyanate and performing stirring for 30 min, and the drying temperature was set to 150° C. The polyimide seamless belt was provided in a tubular form having a diameter of 950 mm, a thickness of 65 μm, an inner surface roughness of 0.3 μm and an outer surface roughness of 0.7 μm. The belt was curled in an inward direction. The sample for measuring the curl of the belt was almost curled, and the curl of the belt was measured to be 4.5 cm.

The seamless belt had a surface resistivity of $3.8\times10^{10}\Omega/\square$ as measured using a surface resistivity meter, and a modulus of 1.3 GPa. The thermal dimensional change rate of the seamless belt could not be measured because the seamless belt was seriously damaged in the course of measurement thereof.

Evaluation

1. Thermal Dimensional Change Rate

Measurement instrument: non-contact 3D measuring machine (EG40600, available from VIMTEC)

Measurement method: portions spaced apart by about 1 cm from corners of a seamless belt having a size of 10 cm×13 cm were perforated under conditions of 25° C. and 60% RH to form circular holes having a diameter of 4 mm and the distance between the centers of adjacent holes was measured, after which the endless belt was heat treated at 250° C. for 3 hours and cooled, and the distance between the centers of adjacent holes was measured again. The dimensional change rate before and after heat treatment was determined from the values thus measured, and then averaged.

2. Surface Roughness

Measurement instrument: LSM (Carl Zeiss LSM5 Pascal)

Measurement method: Rz measurement at 50 magnifications

3. Curl

The seamless belt was cut to a square shape having a size of 10 cm×10 cm, and placed on a smooth glass plate parallel to the surface of the earth, after which the height of the corner of the belt maximally curled upward from the surface of the glass plate was measured.

4. Surface Tension

Measurement instrument: surface tensiometer (514-B2, available from ITHO, Japan)

5. Surface Resistivity

The surface resistivity of the seamless belt of the examples was measured as follows.

Low resistivity measurement instrument: CMT-SR2000N, Four Point Probe System (available from ADVANCED INSTRUMENT TECHNOLOGY)

Low resistivity measurement method

Sample size for measurement of surface resistivity: 10 cm×10 cm

Measurement method of surface resistivity: automatic operation

Measurement conditions: 23° C.±1° C., 30~70% RH

High resistivity measurement instrument: Hiresta UP, Probe UR-100 (available from DIA INSTRUMENTS)

High resistivity measurement method

Sample size for measurement of surface resistivity: 10 cm×10 cm

Measurement method of surface resistivity: applied voltage 100V

Measurement conditions: 23° C.±1° C., 30~70% RH

6. Modulus

The modulus of the seamless belt was measured according to JIS K 6301 using a universal testing machine, Model 1000, available from Instron.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A tubular seamless belt, having an inner diameter of 500 mm or more and having a surface roughness of 3 μm or less, wherein the tubular seamless belt is of a single layer and made from a polymer; and wherein the tubular seamless belt has a curl of 3 cm or less as measured by cutting the seamless belt to a piece of 10 cm×10 cm, placing the seamless belt piece on a surface of a glass plate and then measuring a height of a corner thereof maximally curled upward from the surface of the glass plate.

2. The seamless belt as set forth in claim 1, wherein the polymer is any one or a copolymer or mixture of two or more selected from the group consisting of a polyamide resin, a polyimide resin, a polystyrene resin, a polysiloxane resin and a silicone resin.

3. The seamless belt as set forth in claim 2, wherein the polymer further comprises one or more selected from the group consisting of polyaniline, polythiophene, polypyrrole, polyacetylene, polyphenylene vinylene, polypheneylene sulfide, phthalocyanine, and polyfluorene.

4. The seamless belt as set forth in any one of claims 1 to 3, comprising 3~30 wt % of one or more electrical conductive materials selected from the group consisting of at least one conductive inorganic material selected from among indium tin oxide, indium zinc oxide, ternary indium-tin-zinc oxide, antimony tin oxide and aluminum-doped zinc oxide; carbon black; and graphite.

5. The seamless belt as set forth in any one of claims 1 to 3, comprising 0.01-3 wt % of a highly conductive material.

6. The seamless belt as set forth in claim 5, wherein the highly conductive material is carbon nanotubes.

7. The seamless belt as set forth in any one of claims 1 to 3, comprising 0.3-30 wt % of one or more thermal conductive fillers selected from the group consisting of boron nitride, magnesium oxide, manganese oxide and germanium.

8. The seamless belt as set forth in any one of claims 1 to 3, having a surface resistivity ranging from 1.0×107 to 1.0×1015Ω/□.

9. The seamless belt as set forth in any one of claims 1 to 3, having a thermal dimensional change rate of 1% or less.

10. The seamless belt as set forth in any one of claims 1 to 3, having a modulus of elasticity of 2.0 GPa or more.

* * * * *